(12) United States Patent
Dabagh et al.

(10) Patent No.: US 7,209,971 B1
(45) Date of Patent: Apr. 24, 2007

(54) ARCHITECTURE AND RUN-TIME ENVIRONMENT FOR NETWORK FILTER DRIVERS

(75) Inventors: Alireza Dabagh, Kirkland, WA (US); Aditya Dube, Kirkland, WA (US); Arvind Murching, Issaquah, WA (US); Fengfen Liu, Bellevue, WA (US)

(73) Assignee: Microsoft Corporation, Redmond, WA (US)

(*) Notice: Subject to any disclaimer, the term of this patent is extended or adjusted under 35 U.S.C. 154(b) by 1058 days.

(21) Appl. No.: 10/020,286

(22) Filed: Dec. 11, 2001

(51) Int. Cl.
G06F 15/16 (2006.01)

(52) U.S. Cl. .................. 709/230; 709/223; 709/224; 709/227

(58) Field of Classification Search ............. 709/200, 709/223–224, 227, 230, 250
See application file for complete search history.

(56) References Cited

U.S. PATENT DOCUMENTS

| 6,130,868 | A | 10/2000 | Yamamoto | 369/54 |
| 6,205,492 | B1* | 3/2001 | Shaw et al. | 719/321 |
| 6,243,753 | B1* | 6/2001 | Machin et al. | 709/227 |
| 2001/0023449 | A1 | 9/2001 | Clark et al. | 709/231 |

FOREIGN PATENT DOCUMENTS

CA 2325652 5/2001

OTHER PUBLICATIONS

Shilmover et al. "Windows 2000 Power Toolkit," May 2001, New Riders Publishing, 1st Ed., pp. 95-97, 239-240.*

Wolthusen, Stephen D., "Security Policy Enforcement at the File System Level in the Windows NT Operating System Family" Computer Security Applications Conference, 2001, Proceedings 17th Annual Dec. 10-14, 2001, pp. 55-63.

Hutchinson, Norman C., "RPC in the x-Kernel: Evaluating New Design Techniques" Operating Systems Review, ACM Headquarters, New York, vol. 23, No. 5, Jan. 1989, pp. 91-101.

"Augmentation of the Microsoft TCP/IP Stack Via an Network Driver Interface Specification Intermediate Driver" IBM Technical Disclosure Bulletin, vol. 41, No. 1, Jan. 1998, pp. 301-302.

Russinovich, Mark, et al., "Examining the Windows NT Filesystem" Dr. Dobb's Journal, M&T Publ. Feb. 1997, pp. 42, 44-46, 48.

Risso, Fulvio, et al., "An Architecture for High Performance Network Analysis" Computers and Communications, 2001 Proceedings, Sixth IEEE Symposium on Jul. 3-5, 2001, pp. 686-693.

* cited by examiner

Primary Examiner—Yves Dalencourt
(74) Attorney, Agent, or Firm—Workman Nydegger

(57) ABSTRACT

Filtering data packets in a manner that promotes efficient flow of data through a communication path. A filter stack includes one or more filter instances that may filter data packets that pass through the filter stack. The filter stack is associated with one or more protocol stacks that function in communication paths between a computing device and a network. When filtering instances are inserted to or removed from a filter stack, associated protocol stacks may remain capable of transferring data. An abstract interface facilitates inserting and removing filter instances by passing data to filter drivers that create filter instances. A filter driver may create multiple filter instances. Filtering operations associated with filter instances may be bypassed based on the direction of data flow, control flow, and characteristics of packets.

38 Claims, 5 Drawing Sheets

ARCHITECTURE AND RUN-TIME ENVIRONMENT FOR NETWORK FILTER DRIVERS

BACKGROUND OF THE INVENTION

1. The Field of the Invention

The present invention relates to filtering data packets. More specifically, the present invention relates to systems, methods, and computer program products for an abstract interface to manage insertion of filter instances into a filter stack, removal of filter instances from a filter stack, and bypassing the functionality of a filter instance without disrupting associated protocol stack operations.

2. Background and Relevant Art

In today's world, a large number of computers are coupled to one another through computer networks, such as the Internet, which allow the computers to exchange data. However, the majority of these computers are not directly coupled in a one-to-one relationship. Instead, these computers typically exist in a network environment wherein multiple computers are interconnected, and each computer may exchange data with all other computers included in the network. As the number of computers coupled to conventional networks has increased, the amount of data transferred across such networks has also increased. As a result, techniques for efficient and reliable transfer of data across a computer network have developed.

One technique that promotes efficient transfer of data across a network is "packetizing." Packetizing is a technique whereby larger amounts of data are broken into smaller segments, or "packets." Packets require fewer resources to process than bulk amounts of data. Additionally, by using packets, data may be received in an incremental manner, which reduces the amount of data that must be re-sent when an error in transmission occurs.

Another technique is the use of the Open Systems Interconnect ("OSI") model, which defines a networking framework for implementing communications protocols. The OSI model breaks down the operations for transferring data into seven distinct "layers," each designated to perform certain operations in the data transfer process. Although some networking applications have implemented each of the layers, many applications implement only selective layers for use in transferring data across a network. Two layers incorporated by most protocol stacks are the transport layer and the data link layer. The transport layer is typically associated with packetizing data. An example of a transport layer protocol is the Transmission Control Protocol ("TCP"). The data link layer is typically associated with encoding bits into packets and decoding packets into bits.

Sending data from a computing device to a network typically includes a transport layer driver packetizing bulk data, a data link layer driver decoding the packets into bits, and network hardware, such as a network interface card, transmitting the bits onto the network. A computing device receiving data from a network typically includes these operations in reverse order. That is, a hardware device receives bits, a data link layer driver encodes the bits into packets, and the packets are sent to a transport layer driver to be combined into bulk data. Data link layer drivers may perform specific operations on data when decoding packets into bits for dispatch to network hardware and when encoding bits into packets for dispatch to a transport layer protocol. This is beneficial because data may need modification before it is sent across a network or to higher level protocols.

Historically, data link layer drivers were written or designed for a specific platform to facilitate compatible transfer of data. As the number of protocols and hardware device types has proliferated, this has led to problems. To delete, add, or modify the operations performed by a data link layer driver, the driver must be completely rewritten. Rewriting data link layer drivers is extremely costly, involves a high level of technical expertise, and frequently causes existing hardware to become obsolete or causes the user of such hardware to forego enhanced functionality. Furthermore, when a plurality of data link layer drivers are present within a computer system, functions included in various data link layer drivers may be redundant, yet required for proper operation.

As a result, other methods were developed to perform operations on data, at the data link layer of a protocol stack. One such method is the "IP firewall hook," which "hooks" data packets as they pass between the data link layer and the transport layer of a protocol stack. The benefit of hooking packets is that data monitoring functions may easily be performed, such as checking the originating address of a packet to determine if the packet should be processed or discarded. However, packet hooking has otherwise limited benefits as packets may not be modified and inserted back into the data flow. Furthermore, other more modern networking techniques have developed which are incompatible with packet hooking. For example, IP firewall hooking is not interoperable with the widely used Internet Connection Sharing technology.

Another method for performing operations on data packets passing through a data link layer of a protocol stack is to use "intermediate drivers." Intermediate drivers sit between the transport layer and data link layer and may perform conventional data monitoring as well as other more advanced filtering functions, such as data compression and encryption. Intermediate drivers allow functionality to be added to or deleted from a protocol stack without having to rewrite an underlying link layer device driver. Additionally, multiple intermediate drivers may be layered to perform a series of functions on data passing through a data link layer.

While intermediate drivers provide increased functionality as compared to IP firewall hooking, intermediate drivers have certain inherent problems. Installation and configuration of intermediate drivers often involves incorporating data from or supplying data to an operating system component such as a registry. Filtering environments where intermediate drivers process operating system data is detrimental for at least two reasons.

Installing or removing an intermediate driver from a protocol stack may require the protocol stack to be torn down and rebuilt. This may result in the protocol stack having to be rebuilt in order to add the functionality of the intermediate driver. Likewise, an intermediate driver writing data may cause a protocol stack to malfunction if it is not rebuilt. Tearing down and rebuilding a protocol stack may include rebooting a computer system so data may be properly initialized for an intermediate driver. Additionally, under certain circumstances, an installed intermediate driver may only need to look at network data after the intermediate driver is activated. However, even if inactive, the intermediate driver will remain installed, use valuable operating system resources, and as a result, degrade network performance.

Therefore, what are desired are systems, methods, and computer program products for efficiently filtering data packets and changing filtering operations in a manner that conserves processing and network resources.

BRIEF SUMMARY OF THE INVENTION

The principles of the present invention provide for efficiently filtering data packets and changing filtering operations. Protocol stacks included in a computing device are associated with a filter stack than may include one or more filter instances. Data packets associated with the protocol stacks pass through the filter instances that may perform filtering operations on the data packets. Filter instances may be inserted into or removed from a filter stack in a manner that reduces the chance of disrupting associated protocol stacks.

Additionally, based on the characteristics of a data packet and/or configuration parameters, filtering operations associated with a filter instance may be bypassed. Bypassing filtering operations may be performed in a variety of manners. Bypassing filtering operations may be performed when a packet completely bypasses a filter instance associated with a communication path, such as a data path or control path. Bypassing filtering operations may also be performed when one or more filtering operations internal to a filter instance are not performed on a received data packet. An abstract interface manages the filter stack by calling filter drivers that facilitate the dynamic insertion and removal of filter instances corresponding to the filter stack.

When a filter instance is inserted into the filter stack, a filter driver may receive parameters from the abstract interface. These parameters facilitate configuration of the filter instance to perform filtering operations. Filter instances may be configured to perform different filtering operations based on the characteristics of an input data packet. For example, one filter stack may filter both Internet Protocol ("IP") and Internetwork Packet Exchange ("IPX") packets. If appropriate, the parameters may cause the filter instance to perform the same processing regardless of whether data is included in an IP packet or an IPX packet. Also, if appropriate, the parameters may cause the filter instance to perform similar, but somewhat different, processing depending on whether data is included in IP packet or an IPX packet.

Filtering data packets using a single filter stack for all transports versus one instance per transport may reduce the number of filter instances that are configured and maintained by a computing device. This reduces the chance that a filter stack will be configured with redundant logic and thus also reduces the operational complexity associated with filtering data packets.

When an abstract interface facilitates insertion of a new filter instance into an operational filter stack, it may first notify associated protocol stacks that the current filter stack is about to be paused. The abstract interface may then pause the filter stack. Pausing the filter stack may involve calling a "pause" module that is associated with each filter instance in the current filter stack. Once all filter instances are paused, a new filter instance may be inserted in the proper location in the filter stack. The abstract interface may then notify all protocols that the filter stack is going to be started and that it includes the functionality of the newly added filter instance. The new filter stack may then be started. This may involve calling a "start" module associated with each filter module in the new filter stack.

When inserting a filter instance into a filter stack, the abstract interface may send parameters to an associated filter driver, including a "filter handle." A filter handle is essentially a return address the filter driver may use to pass data associated with a filter instance to the abstract interface. Using received parameters, a filter driver may create a "filter context" and allocate resources for an associated filter instance. The filter context of an associated filter instance may then be passed to the abstract interface. The filter context is essentially a return address the abstract interface may use to pass data to the filter driver regarding a corresponding filter instance.

A filter instance may be inserted into the filter stack according to the received parameters. The filter driver may send a status code to the abstract interface, indicating the results of the attempt to insert the filter instance into the filter stack. Through the use of differing filter handles, multiple independent filter instances of the same filter may be installed into a filter stack. All of these operations may be performed in a manner that reduces the likelihood of tearing down associated protocol stacks or resetting associated operating systems.

During the actual transfer of data, a filter instance may perform some but not all associated internal filtering operations, based on characteristics of an input data packet received by the filter instance. For example, when a filter instance receives an IP packet, it may perform certain filtering operations that are not performed if the filter instance receives an IPX packet. Filter instances may also be configured to operate in "bypass" modes, where a packet completely bypasses a filter instance associated with a communication path, such as a data path or control path. This increases the efficiency of the filtering process as processor resources are not used to performing extraneous filtering operations.

Additional features and advantages of the invention will be set forth in the description that follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

Figure 1:
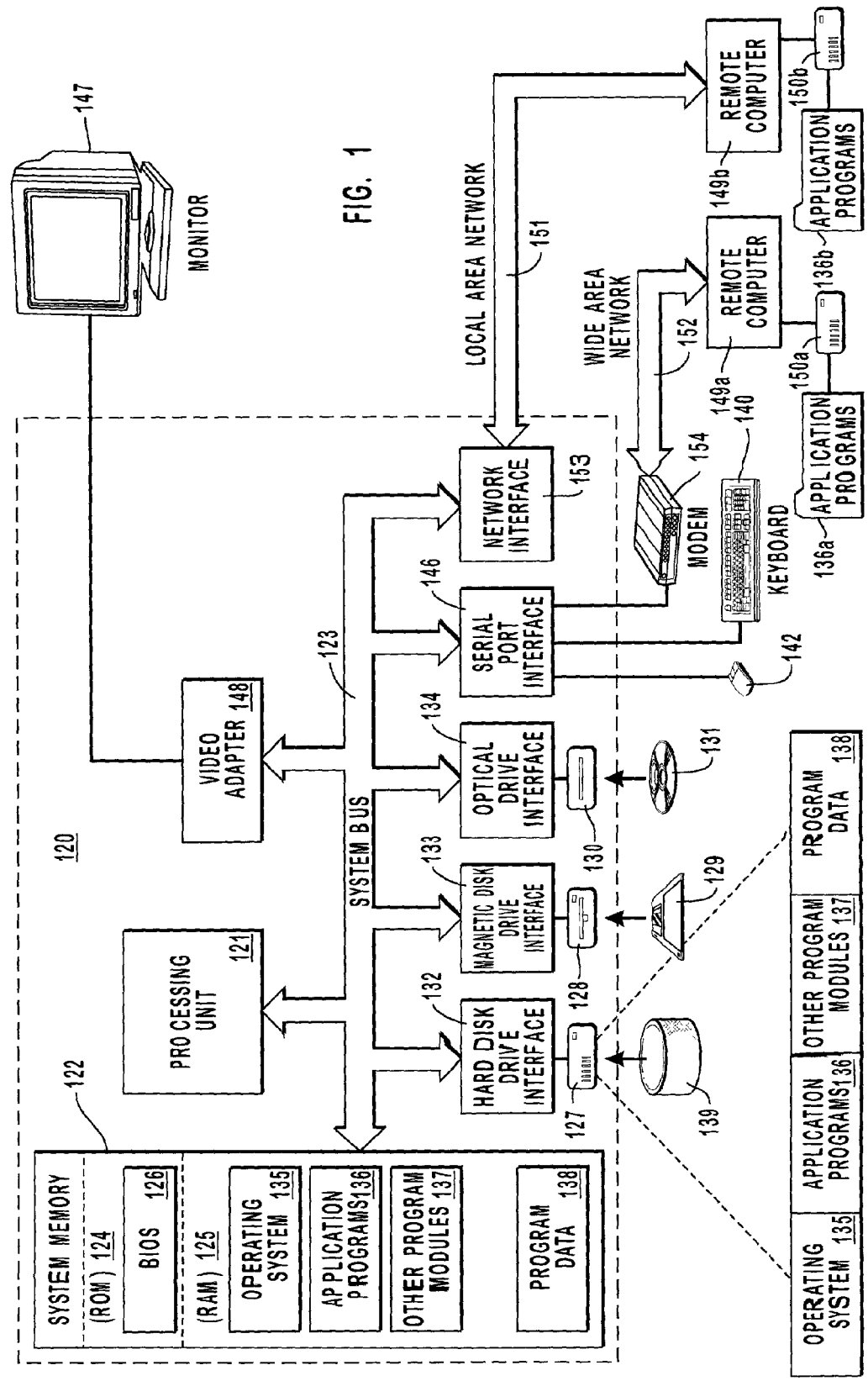
FIG. 1 illustrates an example processing system that provides a suitable operating environment for the present invention.

The present invention extends to systems, methods, and computer program products for filtering data packets in a manner that conserves processor and network resources. An abstract interface manages a filter stack, which includes one or more filter instances. Each filter instance may perform filtering operations on data packets that are received from or sent to a network. A filter instance may perform different filtering operations based on the characteristics of a data packet or packets may completely bypass a filter instance. Additionally, filter instances may be added to or removed from the filter stack in a manner that reduces the chance of associated protocol stacks having to be restarted. The ability to easily interchange filter instances, each of which may perform varied filtering operations, results in a large number of different filtering options.

To add or remove a filter instance from a filter stack, the filter stack may first be paused. Pausing a filter stack may include pausing individual filter instances included in the filter stack. When a filter stack is to be paused, protocol stacks utilizing the filter stack to perform filtering operations may be notified. When the filter stack is paused, a filter driver may be called by an abstract interface to insert or remove a filter instance. After the filter instance is inserted or removed, associated protocol stacks may be notified of the new configuration of the filter stack.

During operation, the abstract interface operates between a transport layer and data link layer to manage the transfer of data packets to a filter stack. When the abstract interface receives a data packet from a data link layer, it passes the data packet to the filter stack starting with the filter instance closest to the data link layer The abstract interface may then pass the data packet to each filter instance successively closer to the transport layer until the data packet passes through all the filter modules. The abstract interface may then send a filtered data packet to a transport layer.

When the abstract interface receives a data packet from a transport layer, it performs these operations essentially in the reverse order. The abstract interface passes the data packet to the filter stack starting with the filter instance closest to the transport layer. The abstract interface may then pass the data packet to each filter instance successively closer to the data link layer until the data packet passes through all the filter instances. The abstract interface may then send a filtered data packet to a data link layer.

During transfer through a filter stack, different data packets may be filtered by different filtering operations. This may be due to the characteristics of a data packet. For example, Internet Protocol ("IP") packets may be filtered in a different manner than Internetwork Packet Exchange ("IPX") packets. Filtering different data packets with different filtering operations may also be due to the direction of flow of a data packet. That is, different filtering operations may be performed on a data packet that is transferred from a data link layer to a transport layer than on a data packet that is transferred from a transport layer to a data link layer.

It may be that in one data flow direction data packets completely bypass a filter instance while in another data flow direction packets do not completely bypass a filter instance. For example, data packets being transferred from the data link layer to the transport layer may completely bypass a filter instance, while packets being transferred from the transport layer to the data link layer are filtered by the filter instance. In addition to data packets, a filter stack may also be configured so that control information traveling through the filter stack completely bypass a filter instance.

The embodiments of the present invention may comprise a special-purpose or general-purpose computer that includes various components, as discussed in greater detail below. Embodiments within the scope of the present invention may also include computer-readable media for carrying or having computer-executable instructions or data structures stored thereon. Such computer-readable media can be any available media that can be accessed by a general-purpose or special-purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general-purpose or special-purpose computer.

When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media. Computer-executable instructions comprise, for example, instructions and data which may cause a general-purpose computer, special-purpose computer, or special-purpose processing device to perform a certain function or group of functions.

FIG. 1 and the following discussion are intended to provide a brief, general description of a suitable computing environment in which the invention may be implemented. Although not required, the invention will be described in the general context of computer-executable instructions, such as program modules, being executed by computers in network environments. Generally, program modules include routines, programs, objects, components, data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those skilled in the art will appreciate that the invention may be practiced in network computing environments with many types of computer system configurations, including personal computers, hand-held devices, mobile telephones, personal digital assistants ("PDAs"), multi-processor systems, microprocessor-based or programmable consumer electronics, network PCs, minicomputers, mainframe computers, and the like. The invention may also be practiced in distributed computing environments where local and remote processing devices are linked (either by hardwired links, wireless links, or by a combination of hardwired or wireless links) through a communications network and both the local and remote processing devices perform tasks.

With reference to FIG. 1, an example system for implementing the invention includes a general-purpose computing device in the form of a conventional computer 120, including a processing unit 121, a system memory 122, and a system bus 123 that couples various system components including system memory 122 to processing unit 121. System bus 123 may be any of several types of bus structures including a memory bus or memory controller, a peripheral bus, and a local bus using any of a variety of bus architectures. System memory may include read only memory ("ROM") 124 and random access memory ("RAM") 125. A basic input/output system ("BIOS") 126, containing the basic routines that help transfer information between elements within the computer 120, such as during start-up, may be stored in ROM 124.

Computer 120 may also include a magnetic hard disk drive 127 for reading from and writing to a magnetic hard disk 139, a magnetic disk drive 128 for reading from or writing to a removable magnetic disk 129, and an optical disk drive 130 for reading from or writing to removable optical disk 131 such as a CD-ROM or other optical media. Magnetic hard disk drive 127, magnetic disk drive 128, and optical disk drive 130 are connected to system bus 123 by a hard disk drive interface 132, a magnetic disk drive-interface 133, and an optical drive interface 134, respectively. The drives and their associated computer-readable media provide nonvolatile storage of computer-executable instructions, data structures, program modules and other data for computer 120. Although the example environment described herein employs a magnetic hard disk 139, a removable magnetic disk 129 and a removable optical disk 131, other types of computer readable media for storing data can be used, including magnetic cassettes, flash memory cards, digital versatile disks, Bernoulli cartridges, RAMs, ROMs, and the like.

Program code means comprising one or more program modules may be stored on hard disk 139, magnetic disk 129, optical disk 131, ROM 124, or RAM 125, including an operating system 135, one or more application programs 136, other program modules 137, and program data 138. A user may enter commands and information into computer 120 through keyboard 140, pointing device 142, or other input devices (not shown), such as a microphone, joy stick, game pad, satellite dish, scanner, or the like. These and other input devices are often connected to processing unit 121 through a serial port interface 146 coupled to system bus 123. Alternatively, the input devices may be connected by other interfaces, such as a parallel port, a game port or a universal serial bus ("USB"). A monitor 147 or another display device is also connected to system bus 123 via an interface, such as video adapter 148. In addition to the monitor, personal computers typically include other peripheral output devices (not shown), such as speakers and printers.

Computer 120 may operate in a networked environment using logical connections to one or more remote computers, such as remote computers 149a and 149b. Remote computers 149a and 149b may each be another personal computer, a server, a router, a network PC, a peer device or other common network node. Remote computers 149a and 149b may include many or all of the elements described above relative to the computer 120, although only memory storage devices 150a and 150b and their associated application programs 136a and 136b are illustrated in FIG. 1. The logical connections depicted in FIG. 1 include a local area network (LAN) 151 and a wide area network (WAN) 152 that are presented here by way of example and not limitation. Such networking environments are commonplace in office-wide or enterprise-wide computer networks, intranets and the Internet.

When used in a LAN networking environment, computer 120 is connected to local network 151 through a network interface adapter 153 or similar adapter. When used in a WAN networking environment, computer 120 may include a modem 154, a wireless link, or other means for establishing communications over the wide area network 152, such as the Internet. Modem 154, which may be internal or external, is connected to system bus 123 via the serial port interface 146. In a networked environment, program modules depicted relative to computer 120, or portions thereof, may be stored in the remote memory storage device. It will be appreciated that the network connections shown are exemplary and other means of establishing communications over wide area network 152 may be used.

In this description and in the following claims, a "dummy routine" is defined as a routine that does not perform any task. A dummy routine may be a portion of a program module or set of computer-executable instructions that includes a header used to receive data, but performs no operations on data it receives. That is, data output from a dummy routine is the same as the data that was input to the dummy routine.

In this description and in the following claims, an "entry point" is defined as a location in a portion of a program module or a set of computer-executable instructions. External program modules may call an entry point and send input data to facilitate execution of instructions associated with an entry point. For example, a dummy routine may have an entry point.

In this description and the following claims, a "system registry" is defined as a database that may be used by an operating system to store configuration information.

In accordance with the present invention, program modules, including abstract interfaces, filter stacks, filter instances, and filter drivers used to facilitate filtering data packets, as well as associated program data, may be stored and accessed from any of the computer-readable media associated with computer system 120. For example, portions of abstract interfaces, filter stacks, filter instances, filter drivers, and associated program data be included in operating system 135, application programs 136, other program modules 137 and/or program data 138, for storage on magnetic hard disk 139. Execution of program modules associated with filtering data packets may be performed in a distributed environment as previously described. For example, a filter driver included in a remote computing device, such as remote computer 149a or 149b, may facilitate insertion of a filter instance into a filter stack included in a local processing device, such as computer 120, or vice versa.

Figure 2A:
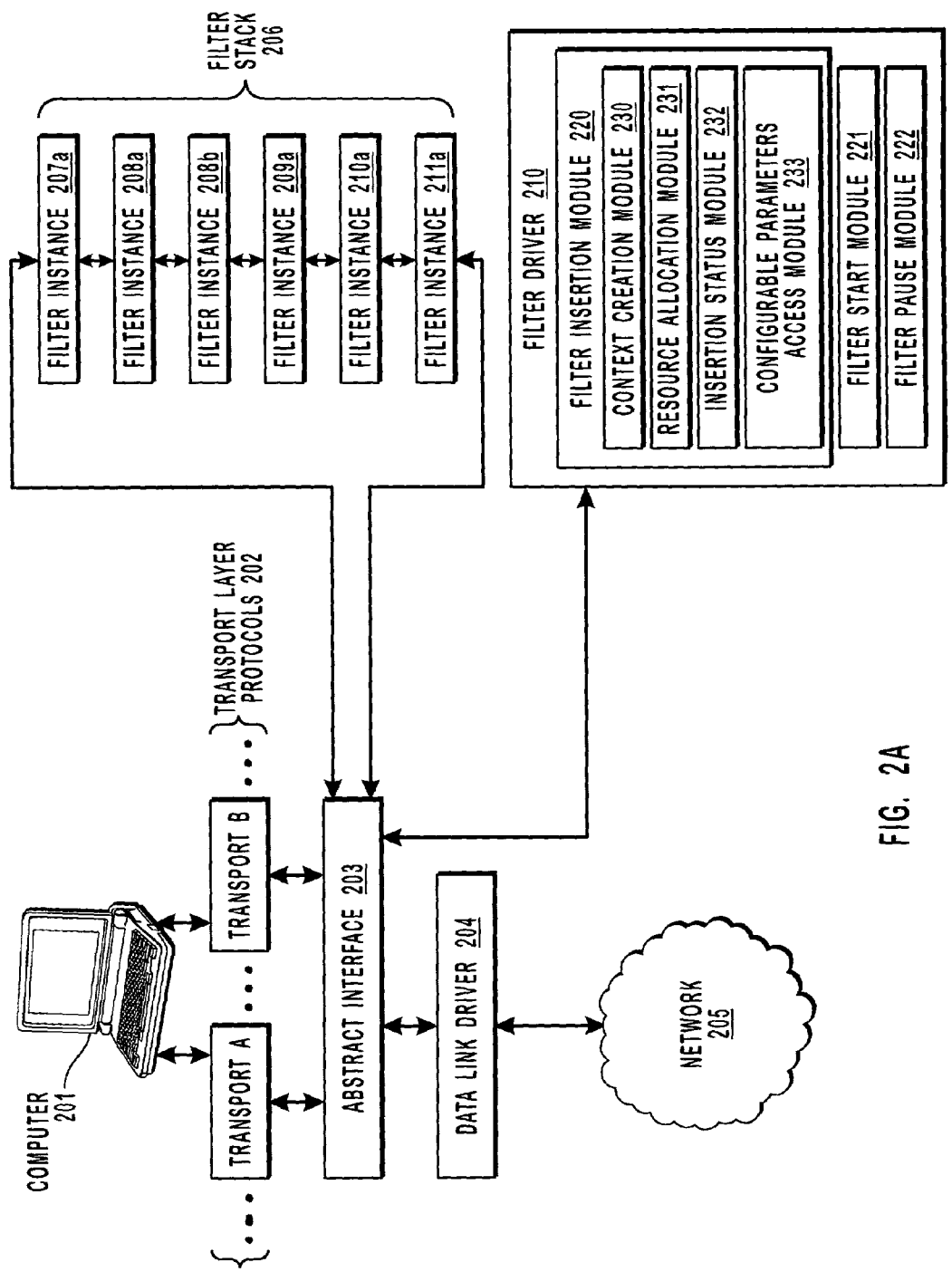
FIG. 2A illustrates an example of some of the functional components that may facilitate inserting a filter instance into a filter stack.

Shown in FIG. 2A are some of the functional components that may be used to facilitate inserting a filter instance into a filter stack. As illustrated, computer 201 is communicatively coupled to network 205. Packets transferred between computer 201 and network 205 may travel through a communication path including transport layer protocols 202, abstract interface 203, and data link driver 204. Computer 201 may include any of the components referenced in the discussion of FIG. 1. Network 205 may include any of the network environments referenced in the discussion of FIG. 1.

Abstract interface 203 may communicate with filter stack 206 and filter driver 210. When receiving a data packet, abstract interface 203 may transfer the data packet to each filter instance included in filter stack 206. If a data packet is received from transport layer protocols 202, abstract interface 203 may pass the data packet to filter instance 207a and then other filter modules progressively closer to data link driver 204. If a data packet is received from data link driver 204, abstract interface 203 may pass the data packet to filter instance 211a and then other filter modules progressively closer to transport layer protocols 202.

Figure 2B:
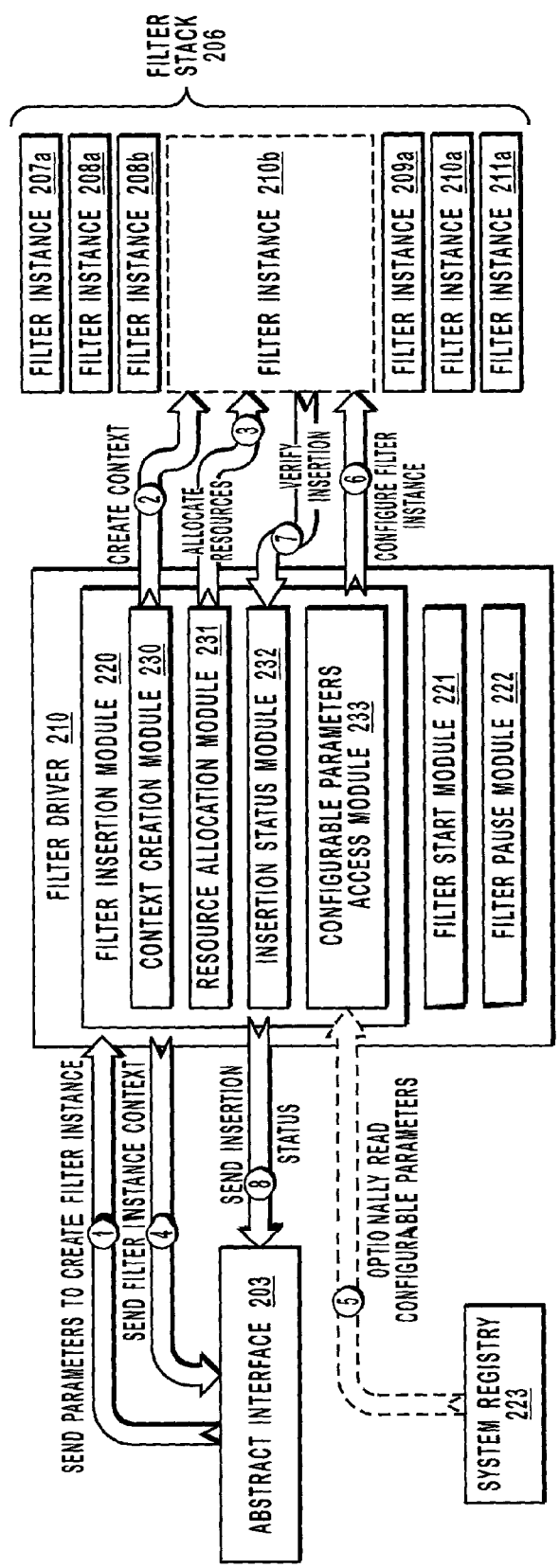
FIG. 2B illustrates an example of some of the interactions that may occur between functional components to facilitate inserting a filter instance into a filter stack.
Figure 3:
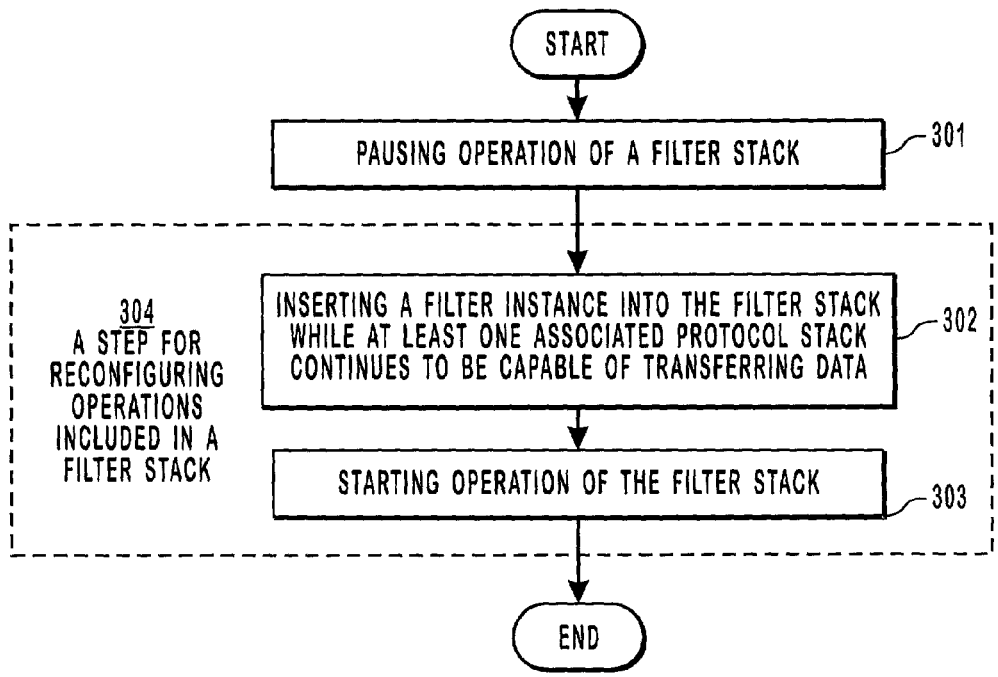
FIG. 3 is a flow diagram illustrating an example of a method for inserting a filter instance into a filter stack.

Abstract interface 203 may communicate with filter driver 210 to facilitate inserting a filter instance into or removing a filter instance from filter stack 206. Included in filter driver 210 are filter insertion module 220, filter start module 221, and filter pause module 222. Shown in FIG. 2B is an example of some of the interactions that may occur between the functional components illustrated in FIG. 2A to facilitate inserting a filter instance into a filter stack. Shown in FIG. 3 is a flow diagram illustrating a method for inserting a filter instance into a filter stack. The method in FIG. 3 will be discussed with reference to the functional components included in FIGS. 2A and 2B.

As shown in FIG. 3, insertion of a filter instance may begin by pausing operation of a filter stack (act 301). This may include pausing individual filter instances that are currently operating in the filter stack. Filter instances may be paused by calling an associated pause module. For example, filter pause module 222 may facilitate pausing filter instances that were inserted into the filter stack by filter driver 210. Protocol stacks may be notified that the filter stack is going to be paused.

As shown in FIG. 2A, filter stack 206 includes filter instance 210a, which may have previously been inserted into filter stack 206 by filter driver 210. Abstract interface 203 may pass data to filter pause module 222 to bring filter instance 210a (or other filter instances inserted into filter stack 206 by filter driver 210) to a paused state. When bringing a filter instance to a paused state, a filter driver may perform certain operations. For example, a filter driver may cause queued packets associated with a filter instance to be flushed, may stop other run-time operations associated with the filter instance, and may delay bringing a filter instance to a paused state until outstanding packets and requests are processed by the filter instance.

Filter instances may be paused in a serial manner. For example, a filter instance closest to transport layer protocols 202 may be paused first. Illustrated in FIG. 2A, the filter instance 207a would be the first filter instance to be paused. After the filter instance closest to transport layer protocols 202 is successfully paused, the next closest filter instance (i.e., filter instance 208a) may be paused. In this example, if the entire filter stack were to be paused, the remaining filter instances would be paused in the following order: 208b, 209a, 210a, and 211a. Once filter instance 211a, the filter instance closest to the data link layer, successfully reaches a paused state, filter stack 206 may also be considered to be in a paused state. Protocol stacks may then be notified that filter stack 206 was successfully paused.

Filter instances may be associated with "routine handlers" that are modules used to facilitate sending, receiving, and requesting data packets. In one embodiment, pausing a filter instance may also include swapping routine handlers with dummy routines. Thus, data packets may be transferred through the dummy routines instead of the actual routine handlers. For example, a data packet may be sent to a dummy routine instead of a routine handler for receiving a data packet. Swapping may be performed by an abstract interface so that a filter instance does not have to process any new packets while it is in a paused state.

When configuring operation of a filter instance, the filter instance may need to be paused. Pausing a particular filter instance may be performed by partially pausing a filter stack. That is, some of the filter instances in the filter stack are paused while other filter instances continue to operate. In these situations, it may be that filter instances closer to the transport layer are paused, while filter instances closer to the data link layer are not paused. This may be done in a serial manner where filter instances closer the transport layer are paused before filter instances closer to the data link layer.

For example, in FIG. 2A, assume that all the filter instances in filter stack 206 are currently operational. If filter instance 208b is to receive configuration parameters, filter instance 207a may be paused, then filter 208a may be paused, and then filter instance 208b may be paused. However, during configuration of filter instance 208b, other filter instances closer to the data link layer, including filter instance 209a, filter instance 210a, and filter instance 211a, may continue to operate.

To restart a partially paused filter stack, the paused filter instance closest to the data link layer may be restarted first, then each paused filter instance closer to the transport layer in a serial manner. In the example in the above paragraph, filter instance 208b would be restarted, then filter instance 208a would be restarted, and then filter instance 207a would be restarted.

The method in FIG. 3 may include a step for reconfiguring operations included in a filter stack (step 304). This may include performing the acts of inserting a filter instance into the filter stack while at least one protocol stack continues to be capable of transferring data (act 302) and starting operation of the filter stack (act 303). Inserting a filter instance while protocol stacks continue to be capable of transferring data promotes efficient transfer of data along a communication path.

Inserting a filter instance into a filter stack may include a filter driver receiving parameters from an abstract interface. Arrow 1 in FIG. 2B illustrates abstract interface 203 sending parameters to filter driver 210. The parameters sent to filter driver 210 may include a filter handle that may be used to reference the created filter instance. For example, if parameters included in arrow 1 were used to create filter instance 210b, filter driver 210 may use the filter handle to send data corresponding with filter instance 210b to abstract interface 203. Parameters may also include the location in a filter stack where a filter instance should be inserted. For example in FIG. 2B, filter driver 210 may have received a parameter, which indicated filter instance 210b should be inserted between filter instances 208b and 209a.

Inserting a filter instance into a filter stack may include creating a filter instance context. Arrow 2 in FIG. 2B illustrates context creation module 230 creating a filter instance context for filter instance 210b. Multiple instances of a filter may be inserted into a filter stack. For example, illustrated in FIG. 2B are filter instances 208a and 208b. The same filter driver may have inserted filter instances 208a and 208b into filter stack 206. However, filter instances 208a and 208b may be different depending on the parameters that were used to create them. The filter instance context may be used to differentiate filter instances, such as filter instances 208a and 208b, that were created by the same filter driver.

Inserting a filter instance into a filter stack may include allocating resources for the filter instance. Arrow 3 in FIG. 2B illustrates resource allocation module 231 allocating resources for filter instance 210b. This may include allocating memory for the filter instance to operate and allocating memory to queue data packets for processing by the filter instance. These are only examples of resources that may be allocated when inserting a filter instance into a filter stack. It would be obvious to one skilled in the art, after having reviewed this description, that various types of resources may be allocated for use by a filter instance.

Inserting a filter instance into a filter stack may include sending the filter instance context to an abstract interface. Arrow 4 in FIG. 2B illustrates filter driver 210 sending the filter instance context for filter instance 210b to abstract interface 203. Abstract interface 203 may use the filter instance context as a reference to filter instance 210b. For example, when abstract interface 203 sends data associated with filter instance 210b to filter driver 210, the abstract interface 203 may include the filter instance context. Abstract interface 203 may use the filter instance context to cause filter driver 210 to become aware that received data is associated with filter instance 210b.

Inserting a filter instance into a filter stack may include reading configurable parameters from a system registry. Arrow 5 in FIG. 2B illustrates configurable parameters access module 233 reading configurable parameters from system registry 223. Configurable parameters access module 233 may use a previously received configuration handle to access the system registry. A configuration handle may be a pointer or other addressing mechanism that directs configurable parameters access module 233 to a portion of the system registry where parameters associated with filter instance 210b may be located. Reading a system registry may include reading an identification number representative of a filter instance.

In one embodiment, a filter driver registers with an abstract interface that may send a configuration handle to the filter driver when it sends parameters, such as those represented by arrow 1 in FIG. 2B. The abstract interface may manage registrations or pass the registrations to a system registry. Alternately, a filter driver may register data in a system registry directly.

Inserting a filter instance into a filter stack may include configuring the filter instance based on received parameters. Received parameters may have been sent from an abstract interface or read from a system registry. Arrow 6 in FIG. 2B illustrates filter insertion module 220 sending parameters to configure filter instance 210b. Filter instances may be configured to perform a variety of filtering operations, for example, monitor data packets, remove, insert and/or modify data in data packets, check the addresses associated with data packets, compress data packets, encrypt data packets, or any combinations thereof.

Filter instances may be configured to filter data packets transferred across a Virtual Private Network ("VPN"). For example, data packets transferred over network 205 may be transferred through the use of virtual connections that have no real physical presence. While data packets are delivered to the correct destination in sequence, the data packets may be routed through various machines in an ad hoc manner. That is, no physical lines are dedicated to the connection.

Filter instances may also be configured with an entry point to receive power management ("PM") and/or plug and play ("PnP") data. When a computing device goes into a stand-by mode due to inactivity, associated power management data may be sent to filter instances. Likewise, if a peripheral device that may affect the flow of data packets, such as a network interface card, is inserted into a computing device, associated data may be sent to filter instances.

In one embodiment, filter instances may be configured using a management interface. A management interface may include a user interface where a user enters parameters associated with filter instances via an input device. These parameters are received by a filter driver and facilitate configuring a filter instance. An example of this is a user configurable firewall.

Configuring a filter instance may also include "binding" a filter instance to a plurality of transport layer protocols. When a filter instance is bound to a transport layer protocol it may filter data packets associated with the transport layer protocol. For example, filter instance 210b may be configured to filter data packets both transport A and transport B illustrated in FIG. 2A.

It should be understood that the previously described filter instance configurations are only examples. It would be obvious to one skilled in the art, after having reviewed this description, that filter instances may be configured in a wide variety of manners.

Inserting a filter instance into a filter stack may include verifying that a filter instance was properly inserted into a filter stack. This may include sending an insertion status to an abstract interface. Arrows 7 and 8 in FIG. 2B illustrate insertion status module 232 receiving a verification of the insertion status of filter instance 210b and sending the insertion status to abstract interface 203.

Returning to FIG. 3, inserting a filter instance into a filter stack may include starting operation of the filter stack (act 303). This may include starting individual filter instances that are currently paused. Filter instances may be started by calling an associated start module. For example, filter start module 221 may facilitate starting filter instances that were inserted into the filter stack by filter driver 210, such as filter instances 210a and 210b. Protocol stacks may be notified that the filter stack is going to be started.

Abstract interface 203 may pass data to filter start module 221 to bring filter instances 210a, 210b, or other filter instances inserted into filter stack 206 by filter driver 210, to an operational state. Filter instances may be started in a serial manner. For example, a filter instance closest to data link driver 204 (i.e., filter instance 211a) may be started first. After the filter instance closest to data link driver 204 is successfully started, the next closest filter instance may be started. Illustrated in FIG. 2B, this would be filter instance 210a. In this example, the remaining filter instances would be started in the following order: 209a, 210b, 208b, 208a, and 207a. Once filter instance 207a successfully reaches an operational state, filter stack 206 may also be considered to be in an operational state. Starting a filter stack may also include swapping dummy routines with routine handlers so that data packets may be properly processed by filter stack 206. Protocol stacks may then be notified that filter stack 206 is operational.

In may be that a filter stack that is entirely paused is partially restarted. That is, some of the filter instances in the filter stack are restarted while other filter instances remain paused. This may occur when a particular filter instance in a filter stack is to be restarted. In these situations, it may be that filter instances closer to the data link layer are restarted, while filter instances closer to the transport layer are remain paused. This may be done in a serial manner, where filter instances closer to the data link layer are restarted before filter instances closer to the transport layer.

For example, in FIG. 2A, assume that all the filter instances in filter stack 206 are currently paused. If filter instance 209a is to be restarted, filter instance 211a may be restated first, then filter instance 210a, and then filter instance 209b. Other filter instances closer to the transport layer, including filter instance 208b, filter instance 208a, and filter instance 207a, may remain paused.

In should be understood that modules and arrows illustrated in FIGS. 2A and 2B are merely examples. Different modules and associated functionality may be combined without departing from the spirit and scope of the present invention. For example, filter driver 210 may include a single module that performs operations associated with adding a filter instance to a filter stack. In may also be that filter driver 210 is included as part of abstract interface 203. Likewise, the order in which functionality associated with the arrows included in FIG. 2B is executed is also merely exemplary. The functionality associated with the arrows included in FIG. 2B may be executed in a variety of orders without departing from the spirit and scope of the present invention. It would be obvious to one skilled in the art, after having reviewed this description, that modules, as well as their associated functions, may be combined in a wide variety of manners.

In addition to inserting a filter instance into a filter stack, embodiments of the present invention may remove a filter instance from a filter stack. It may be, that when removing a filter instance from a filter stack, the filter stack is paused and started using the methods previously described.

When removing a filter instance from a filter stack, a filter driver may release resources that were previously allocated for use by the filter instance. For example, abstract interface 203 may send data to filter driver 210 indicating that filter instance 210b should be removed from filter stack 206. Filter stack 206 may be paused and filter driver 210 may remove filter instance 210b from filter stack 206. Filter driver 210 may then release the resources that were allocated for use by filter instance 210b. Filter stack 206 may then be started. Associated protocol stacks may be notified that the filter stack no longer includes the functionality of filter instance 210b.

Figure 2C:
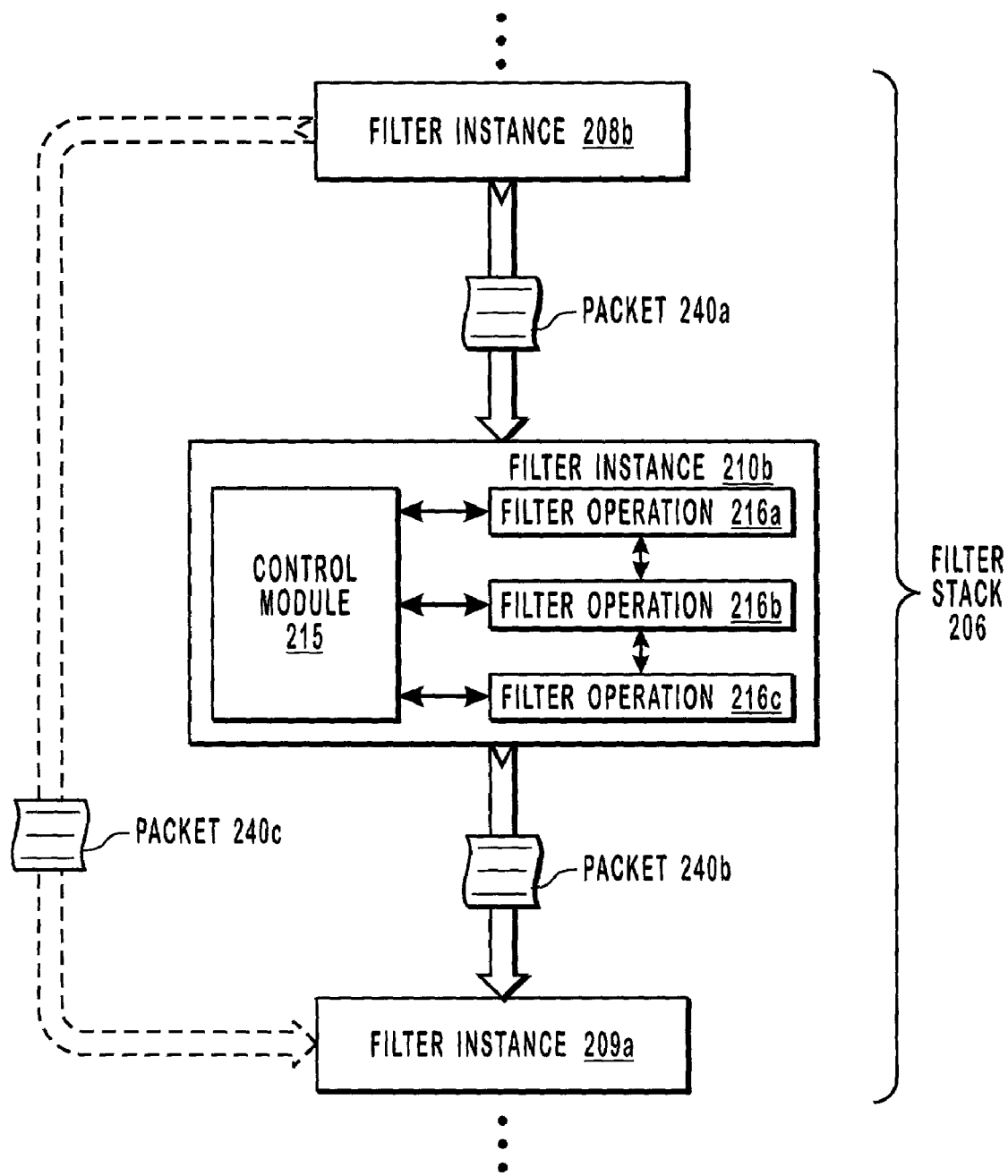
FIG. 2C illustrates an example of some of the functional components that may facilitate bypassing filtering operations associated with a filter instance.
Figure 4:
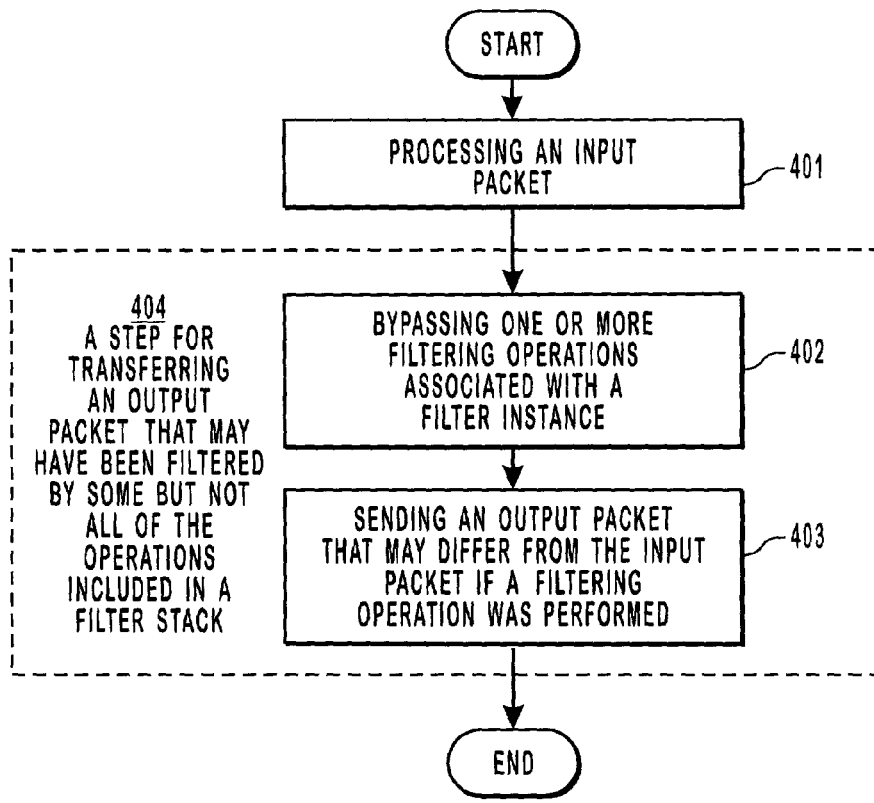
FIG. 4 is flow diagram illustrating an example of a method for bypassing at least some of the filtering operations associated with a filter instance.

Shown in FIG. 2C is an example of some of the functional components that may facilitate bypassing filtering operations associated with a filer instance. Filtering operations may be bypassed based on the characteristics associated with a packet and/or configuration information. Bypassing filtering operations may include a packet completely bypassing a filter instance and a received packet bypassing one or more internal filtering operations of a filter instance. Shown in FIG. 4 is a flow diagram illustrating an example of a method for bypassing at least of the filtering operations associated with a filter instance. The method in FIG. 4 will be discussed with reference to the functional components included in FIG. 2C.

Illustrated in FIG. 2C is filter instance 210b, which is included in filter stack 206. Filter instance 210b includes control module 215 as well as filter operations 216a, 216b, and 216c. Illustrated in FIG. 2C is a communication path whereby packets are transferred from the transport layer to the data link layer. However, the present invention may also be practiced with a communication path whereby packets are transferred from the data link layer to the transport layer. A communication path may include a data path whereby data packets are transferred across a protocol stack or a control path whereby control packets are transferred across a protocol stack.

Such control paths may include requests and status indications. A request may be transferred from a transport layer down to the data link layer. A request may include an indication that a network interface adapter, such as network interface adapter 153, is to accept multicast packets or is to be placed in promiscuous mode. A request may also include a query. For example, a request may query for the media access control address of a network interface adapter or whether a network interface adapter is currently receiving multicast packets.

A status indication may be transferred from the data link layer to a transport layer. A status indication may include an indication from the data link layer that media is currently connected or disconnected.

The method in FIG. 4 may include an act of processing an input packet (act 401). This may include filter instance 210b receiving packet 240a. In FIG. 2C, packet 240a was sent from filter instance 208b. In this illustrated embodiment, packet 240a would be transferred along a data path from transport layer protocols 202 to data link driver 204. However, this is merely illustrative, as data packets may also be filtered when transferred along a data path from data link driver 204 to transport layer protocols 202. It may also be that packets being transferred along a control path are filtered. It may also be that packets are not filtered by filter instances in any particular order. For example, a packet may be passed from filter instance 208a to filter instance 210a. An input packet may also be a packet that was created by a filter instance.

In an alternate embodiment, a packet represented by the packet 240c may be processed. Processing of packet 240c may determine that packet 240c is being transferred across a data path or control path that completely bypasses the filtering operations of filter instance 210b. As illustrated in FIG. 2C, packet 240c is transferred by the dashed arrow from filter instance 208b directly to filter instance 209a. Packet 240c may bypass filter instance 210b because filter instance 210b has been configured to operate in "bypass" mode for a data path or control path.

A filter instance may be configured by abstract interface 203 to operate in bypass mode. A filter instance may be configured for bypass mode when it is initially started or at run time. That is, a filter instance that was not initialized into bypass mode may later be set to operate in bypass mode. During initialization, a filter driver indicates that it wishes a filter instance to start in bypass mode for one or more data paths or control paths by indicating a NULL handler for that data path during the start process.

After initialization and at run time, a filter driver may wish to set a filter instance to bypass mode for some data paths or some control paths. In that case, the filter driver will ask the abstract interface to restart the filter instance. The abstract interface will then pause the filter instance and restart it in accordance with the methods previously illustrated in this description. When the filter instance is restarted, the filter driver may indicate that the filter instance is to operate in bypass mode for some data paths or control paths, by supplying NULL handlers for the bypassed paths.

A filter instance may be configured so that packets associated with some data paths or control paths bypass the filter instance and packets associated with other data paths or control paths are received by the filter instance. For example, a filter instance may be configured to bypass status indications, yet receive all other types of packets. This may be done to dampen media disconnect messages, which an application is not interested in. In another example, data packets transferred along a data path from the data link layer to the transport layer may be received by a filter instance, while data packets transferred along a data path from the transport layer to the data link layer bypass the filter instance.

Likewise a filter instance that is currently in bypass mode for a data path or control path may, at runtime, be configured to receive packets for the data path or control path. In these cases, a filter driver may ask abstract interface 203 to restart the filter instance. Abstract interface 203 will then pause and restart the filter instance, in accordance with the methods previously illustrated in this description. When the filter instance is restarted, the filter driver may indicate that the filter instance is to receive packets from data paths or control paths, by supplying a non-NULL handler for activated data paths.

Configuring a filter instance to operate in bypass mode or receive packets may be caused by an external event. For example, a user may configure a filter instance, through a management interface associated with a fire wall, to operate in bypass mode for some data paths. This may be done in cases where the filter instances filtering operations cause a disruption in an application currently in use.

The method in FIG. 4 may include a step for transferring an output packet that may have been filtered by some but not all of the operations included in a filter stack (step 404). This may include performing the acts of bypassing one or more filtering operations associated with a filter instance (act 402) and sending an output packet that may differ from the input packet if a filtering operation was performed (act 403). Transferring a packet that bypasses filtering operations may increase the efficiency of the filtering process.

Bypassing one or more operations associated with a filter instance (act 402) may include bypassing one or more of the filtering operations included in filter instance 210*b*. When filter instance 210*b* receives data packet 240*a*, control module 215 may analyze the characteristics of data packet 240*a*. Analysis may include determining the direction of data flow of an input packet. The direction of data flow may be from a data link driver to a transport layer protocol or from a transport layer protocol to a data link driver. Analysis may also include determining a protocol associated with an input data packet, such as IP, TCP, Internetwork Packet Exchange ("IPX"), other transport layer protocols, or other protocols associated with layers of the Open Systems Interconnect ("OSI") model. If control module 215 determines that data packet 240*a* is associated with IPX, filter operations 216*a* and 216*c* may be bypassed. However, if control module 215 determines that data packet 240*a* is associated with IP, filter operation 216*b* may be bypassed.

Alternatively, it may be that filter instance 210*b* is configured so that packets along a data path or control path completely bypass filter instance 210*b*. As illustrated in FIG. 2C, filter instance 210*b* may be configured so that packets transferred along a data path from the transport layer to the data link layer bypass filter instance 210*b*. If packet 240*c* were a data packet, it would bypass filter instance 210*b* as illustrated by the dashed arrow from filter instance 208*b* to filter instance 209*a*.

It may also be the case, that although filter instance 210*b* receives a packet, control module 215 passes the packet directly through filter instance 210*b* without performing any filtering operations. If all filtering operations are bypassed in this manner, data packet 240*a* and data packet 240*b* may be substantially similar.

Sending an output data packet that may differ from the input data packet if a filtering operation was performed (act 403) may include sending a data packet that includes modified data. If any of the filtering operations included in filter instance 210*b* are performed, data packet 240*b* may differ from data packet 240*a*. This may occur if any filtering operations added data to data packet 240*a*, removed data from data packet 240*a* or modified data included in data packet 240*a*. However, if no filtering operations were performed, data packet 240*a* and data packet 240*b* may be substantially similar.

Using the methods of the present invention, data packets may be filtered in a manner that promotes efficient flow of data packets through a communication path. Filter instances may be inserted into or removed from a filter stack while associated protocol stacks may remain capable of transferring data. This conserves processor and network resources, as protocol stacks are not rebuilt when the functionality of a filter stack changes. Since filter instances may be used by a plurality of protocols, there is a reduced chance that redundant logic will be implemented in a computing device. Additionally, bypassing filtering operations based on the characteristics of a data packet and/or configuration information reduces the chance that extraneous processor operations will be performed.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes, which come within the meaning and range of equivalency of the claims, are to be embraced within their scope.

What is claimed and desired secured by United States Letters Patent is:

1. In a computing device communicatively coupled to a network by a network communication path that includes one or more network protocol stacks and an abstract interface, the abstract interface situated at a relative location within each of the one or more protocol stacks between a transport layer and a data link layer respectively, the abstract interface solely managing access to a communication filter stack for the one or more network protocol stacks, the communication filter stack including one or more communication filter instances configured to perform data filtering operations on data packets being transferred via the one or more network protocol stacks when the data packets are accessed at the abstract interface, a method for inserting a communication filter instance into a communication filter stack without disrupting the operation of the one or more network protocol stacks the abstract interface is situated within so as to conserve processor and network resources, the method comprising:

an act of the abstract interface pausing operation of an operational communication filter stack to transition the operational communication filter stack to a paused communication filter stack without disrupting operation of the one or more network protocol stacks;

an act of the abstract interface transferring at least one data packet between a transport layer and data link driver of a protocol stack the abstract interface is situated within without performing any data filtering operations on the data packet subsequent to transitioning the operational communication filter stack to a paused communication filter stack and while the paused communication filter stack remains paused;

an act of the abstract interface causing a communication filter instance to be inserted into the paused communication filter stack while the one or more network protocol stacks continue to be capable of transferring data between corresponding transport and data link layers; and an act of the abstract interface restarting the paused communication filter stack to transition the paused communication filter stack back into the operational communication filter stack without disrupting operation of the one or more network protocol stacks.

2. The method as recited in claim 1, wherein pausing operation of an operational communication filter stack comprises the following:

an act of pausing one or more communication filter instances included in the operational communication filter stack.

3. The method as recited in claim 2, wherein pausing one or more communication filter instances included in the operational communication filter stack comprises the following:
an act of one or more pause routines receiving data indicating that the one or more communication filter instances should be paused.

4. The method as recited in claim 1, wherein pausing operation of an operational communication filter stack comprises the following:
an act of redirecting a transferred data packet to a dummy routine that returns the data packets back to the abstract interface without modifying the data included in the data packet.

5. The method as recited in claim 1, wherein the abstract interface causing a communication filter instance to be inserted into the paused communication filter stack comprises the following:
an act of inserting a communication filter instance that was configured by using parameters received from the abstract interface.

6. The method as recited in claim 1, wherein the abstract interface causing a communication filter instance to be inserted into the paused communication filter stack comprises the following:
an act of a communication filter driver receiving a filter handle that may be used to facilitate transferring data to an abstract interface.

7. The method as recited in claim 1, wherein the abstract interface causing a communication filter instance to be inserted into the paused communication filter stack comprises the following:
an act of a communication filter driver allocating resources for the communication filter instance.

8. The method as recited in claim 1, wherein the abstract interface causing a communication filter instance to be inserted into the paused communication filter stack comprises the following:
an act of a communication filter driver creating a filter instance context for the communication filter instance.

9. The method as recited in claim 8, wherein a communication filter driver creating a filter instance context for the communication filter instance comprises the following:
an act of the communication filter driver sending the filter instance context to the abstract interface.

10. The method as recited in claim 1, wherein the abstract interface causing a communication filter instance to be inserted into the paused communication filter stack comprises the following:
an act of a communication filter driver registering data with the abstract interface.

11. The method as recited in claim 1, wherein the abstract interface causing a communication filter instance to be inserted into the paused communication filter stack comprises the following:
an act of a communication filter driver registering data in a system registry.

12. The method as recited in claim 1, wherein the abstract interface causing a communication filter instance to be inserted into the paused communication filter stack comprises the following:
an act of inserting a communication filter instance that was configured by using parameters received from a system registry.

13. The method as recited in claim 1, wherein the abstract interface causing a communication filter instance to be inserted into the paused communication filter stack comprises the following:
an act of inserting the communication filter instance in a predetermined location in the paused filter stack.

14. The method as recited in claim 1, wherein the abstract interface causing a communication filter instance to be inserted into the paused communication filter stack comprises the following:
an act of inserting a communication filter instance that is capable of filtering data packets transferred over virtual connections.

15. The method as recited in claim 1, wherein the abstract interface causing a communication filter instance to be inserted into the paused communication filter stack comprises the following:
an act of inserting a communication filter instance that includes an entry point to receive data associated with the power management of the computing device.

16. The method as recited in claim 1, wherein the abstract interface causing a communication filter instance to be inserted into the paused communication filter stack comprises the following:
an act of inserting a communication filter instance that includes an entry point to receive data associated with plug and play devices.

17. The method as recited in claim 1, wherein the abstract interface causing a communication filter instance to be inserted into the paused communication filter stack comprises the following:
an act of inserting a communication filter instance that includes properties that may be modified through a management interface.

18. The method as recited in claim 1, wherein the abstract interface causing a communication filter instance to be inserted into the paused communication filter stack comprises the following:
an act of a communication filter driver verifying that the communication filter instance was inserted into the paused filter stack.

19. The method as recited in claim 18, wherein a communication filter driver verifying that the communication filter instance was inserted into the paused filter stack comprises the following:
an act of the communication filter driver sending an insertion status to the abstract interface.

20. The method as recited in claim 1, wherein the abstract interface restarting the paused communication filter stack comprises the following:
an act of starting one or more communication filter instances included in the paused communication filter stack.

21. The method as recited in claim 20, wherein starting one or more communication filter instances included in the communication filter stack comprises the following:
an act of one or more start routines receiving data indicating that the one or more communication filter instances are to be started.

22. The method as recited in claim 1, further comprising:
an act of notifying associated network protocol stacks that operation of the operational communication filter stack is going to be paused.

23. The method as recited in claim 1, further comprising:
an act of notifying associated network protocol stacks that the operational communication filter stack now includes the inserted communication filter instance.

24. The method as recited in claim 1, further comprising
an act of notifying associated network protocol stacks that the paused communication filter stack is going to be restarted.

25. In a computing device communicatively coupled to a network by a network communication path that includes one or more network protocol stacks and an abstract interface, the abstract interface situated at a relative location within each of the one or more protocol stacks between an transport layer and a data link layer respectively, the abstract interface solely managing access to a communication filter stack for the one or more network protocol stacks, the communication filter stack including one or more communication filter instances configured to perform data filtering operations on data packets being transferred via the one or more network protocol stacks when the data packets are accessed at the abstract interface, a method for removing a communication filter instance from a communication filter stack without disrupting the operation of the one or more network protocol stacks the abstract interface is situated within so as to conserve processor and network resources, the method comprising:

an act of the abstract interface pausing operation of an operational communication filter stack to transition the operational communication filter stack to a paused communication filter stack without disrupting operation of the one or more network protocol stacks;

an act of the abstract interface transferring at least one data packet between a transport layer and data link driver of a protocol stack the abstract interface is situated within without performing any data filtering operations on the data packet subsequent to transitioning the operational communication filter stack to a paused communication filter stack and while the paused communication filter stack remains paused;

an act of the abstract interface causing a communication filter instance to be removed from the paused communication filter stack while the one or more protocol stacks continues to be capable of transferring data between corresponding transport and data link layers; and an act of the abstract interface restarting the paused communication filter stack to transition the paused communication filter stack back into the operational communication filter stack without disrupting operation of the one or more network protocol stacks.

26. The method as recited in claim 25, wherein the abstract interface pausing operation of an operational communication filter stack comprises the following:
an act of pausing one or more communication filter instances included in the communication filter stack.

27. The method as recited in claim 26, wherein the abstract interface pausing one or more communication filter instances included in the communication filter stack comprises the following:
an act of one or more pause routines receiving data indicating that the one or more communication filter instances should be paused.

28. The method as recited in claim 25, wherein the abstract interface pausing operation of an operational communication filter stack comprises the following:
an act of redirecting transferred data packets to a dummy routine that returns the data packets back to the abstract interface without modifying the data included in the data packet.

29. The method as recited in claim 25, wherein the abstract interface causing a communication filter instance to be removed from the paused communication filter stack comprises the following:
an act of pausing the communication filter instance.

30. The method as recited in claim 25, wherein the abstract interface causing a communication filter instance to be removed from the paused communication filter stack comprises the following:
an act of a communication filter driver releasing resources associated with the communication filter instance.

31. The method as recited in claim 25, wherein the abstract interface restarting the paused communication filter stack comprises the following:
an act of starting one or more communication filter instances included in the paused communication filter stack.

32. The method as recited in claim 31, wherein starting one or more communication filter instances included in the paused communication filter stack comprises the following:
an act of one or more start routines receiving data indicating that the one or more communication filter instances are to be started.

33. The method as recited in claim 25, further comprising:
an act of notifying associated network protocol stacks that operation of the operational communication filter stack is going to be paused.

34. The method as recited in claim 25, further comprising:
an act of notifying associated network protocol stacks that communication filter instance has been removed from the operational filter stack.

35. The method as recited in claim 25, further comprising
an act of notifying associated network protocol stacks that the paused communication filter stack is going to be restarted.

36. In a computing device communicatively coupled to a network by a network communication path that includes one or more network protocol stacks and an abstract interface, the abstract interface situated at a relative location within each of the one or more protocol stacks between an transport layer and a data link layer respectively, the abstract interface solely managing access to a communication filter stack for the one or more network protocol stacks, configured to perform data filtering operations on data packets being transferred via the one or more network protocol stacks when the data packets are accessed at the abstract interface, a method for reconfiguring the communication filter stack without disrupting the operation of the one or more network protocol stacks the abstract interface is situated within so as to conserve processor and network resources, the method comprising:

an act of the abstract interface pausing operation of an operational communication filter stack to transition the operational communication filter stack to a paused communication filter stack without disrupting operation of the one or more network protocol stacks;

an act of the abstract interface transferring at least one data packet between a transport layer and data link driver of a protocol stack the abstract interface is situated within without performing any data filtering operations on the data packet subsequent to transitioning the operational communication filter stack to a paused communication filter stack and while the paused communication filter stack remains paused;

a step for the abstract interface reconfiguring filtering operations included in the filter stack in a manner that promotes efficient transfer of data along the network communication path such that the one or more protocol stacks continue to be capable of transferring data between corresponding transport and data link layers during reconfiguration.

37. A computer program product for use at a computing device communicatively coupled to a network by a communication path that includes one or more network protocol stacks and an abstract interface situated at a relative location within each of the one or more protocol stacks between a transport layer and a data link layer respectively the abstract interface solely managing access to a communication a filter stack for the one or more network protocol stacks, the communication filter stack including one or more communication filter instances configured to perform data filtering operations on data packets being transferred via the one or more network protocol stacks when the data packets are accessed at the abstract interface, the computer program product of implementing a method for inserting a communication filer instance into the communication filter stack without disrupting the operation of the one or more protocol stacks the abstract interface is situated within so as to conserve processor and network resources, the computer program product comprising:

a physical computer-readable medium having stored thereon computer-executable instructions, that when executed at the computing device cause the computing device to perform the method, including:

an act of the abstract interface pausing operation of an operational communication filter stack to transition the operational communication filter stack to a paused communication filter stack without disrupting operation of the one or more network protocol stacks;

an act of the abstract interface transferring at least one data packet between a transport layer and data link driver of a protocol stack the abstract interface is situated within without performing any data filtering operations on the data packet subsequent to transitioning the operational communication filter stack to a paused communication filter stack and while the paused communication filter stack remains paused;

an act of the abstract interface causing a communication filter instance to be inserted into the paused communication filter stack while the one or more network protocol stacks continues to be capable of transferring data between corresponding transport and data link layers; and an act of the abstract interface restarting the paused communication filter stack to transition the paused communication filter stack back into the operational communication filter stack without disrupting operation of the one or more network protocol stacks.

38. A computer program product for use at a computing device communicatively coupled to a network by a network communication path that includes one or more network protocol stacks and an abstract interface, the abstract interface situated at a relative location within each of the one or more protocol stacks between a transport layer and a data link layer respectively, the abstract interface solely managing access to a communication a filter stack for the one or more network protocol stacks, the communication filter stack including one or more communication filter instances, configured to perform data filtering operations on portions of data packets being transferred via the one or more network protocol stacks when the data packets are accessed at the abstract interface, the computer program product for implementing a method for removing a communication filter instance from a communication filter stack without disrupting the operation of the one or more network protocol stacks the abstract interface is situated within so as to conserve processor and network resources, the computer program product comprising:

a physical computer-readable medium carrying computer-executable instructions, that when executed at the computing device cause the computing device to perform the method, including:

an act of the abstract interface pausing operation of an operational communication filter stack to transition the operational communication filter stack to a paused communication filter stack without disrupting operation of the one or more network protocol stacks;

an act of the abstract interface transferring at least one data packet between a transport layer and data link driver of a protocol stack the abstract interface is situated within without performing any data filtering operations on the data packet subsequent to transitioning the operational communication filter stack to a paused communication filter stack and while the paused communication filter stack remains paused;

an act of the abstract interface causing a communication filter instance to be removed from the paused communication filter stack while the one or more protocol stacks continues to be capable of transferring data between corresponding transport and data link layers; and an act of the abstract interface restarting the paused communication filter stack to transition the paused communication filter stack back into the operational communication filter stack without disrupting operation of the one or more network protocol stacks.

* * * * *